Jan. 5, 1971   E. R. KNOWLES   3,551,954
CONTAINER FORMING APPARATUS
Original Filed Sept. 14, 1965   3 Sheets-Sheet 1
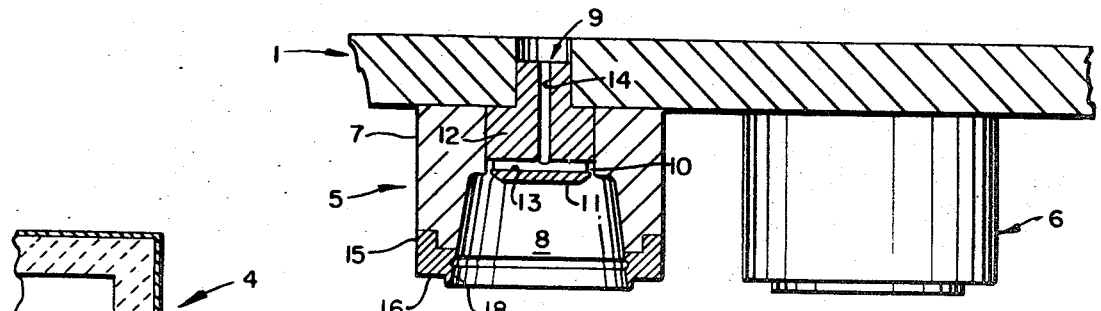
FIG. 1
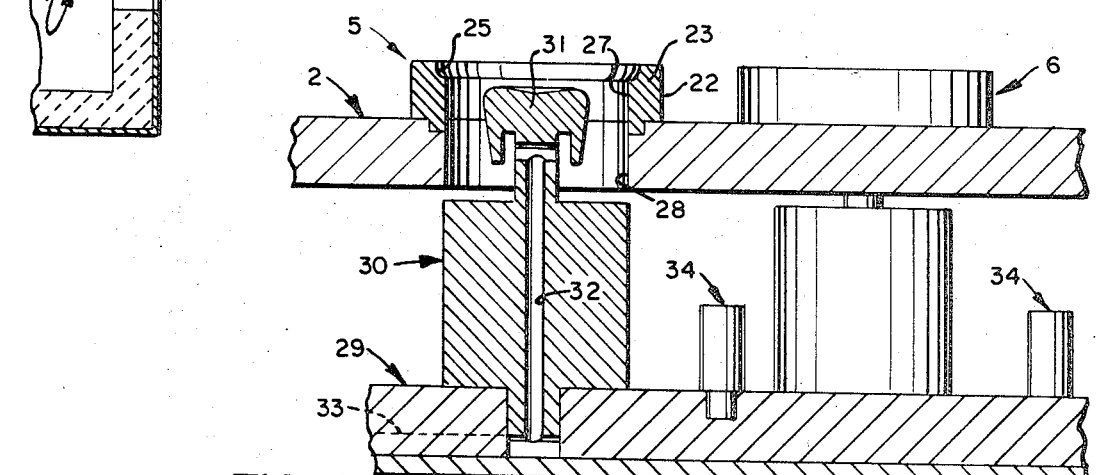
FIG. 2   FIG. 3
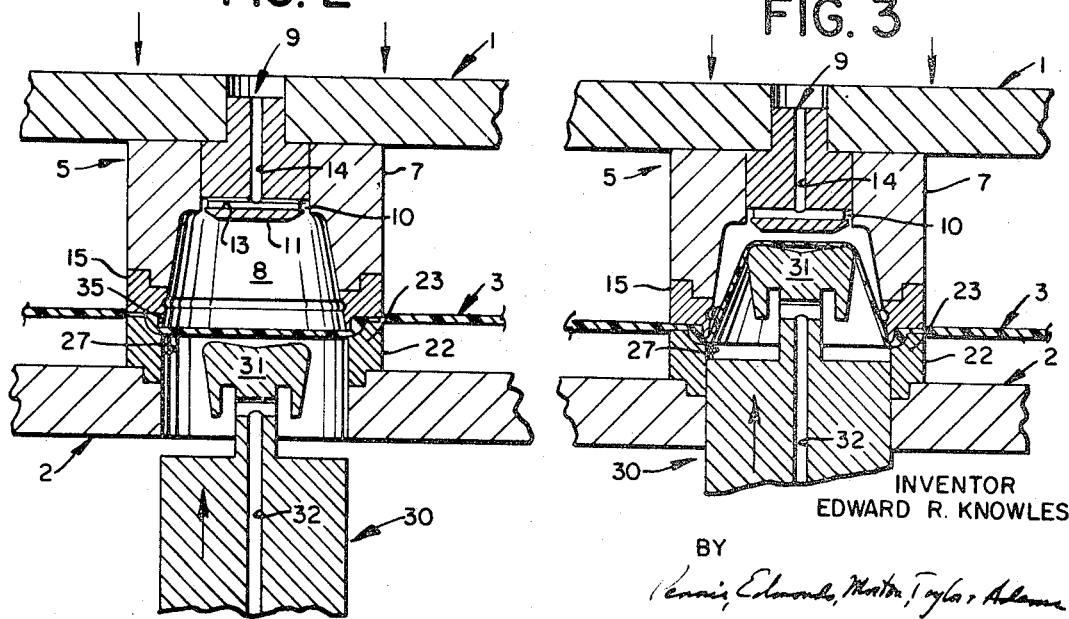
INVENTOR
EDWARD R. KNOWLES
BY
ATTORNEY

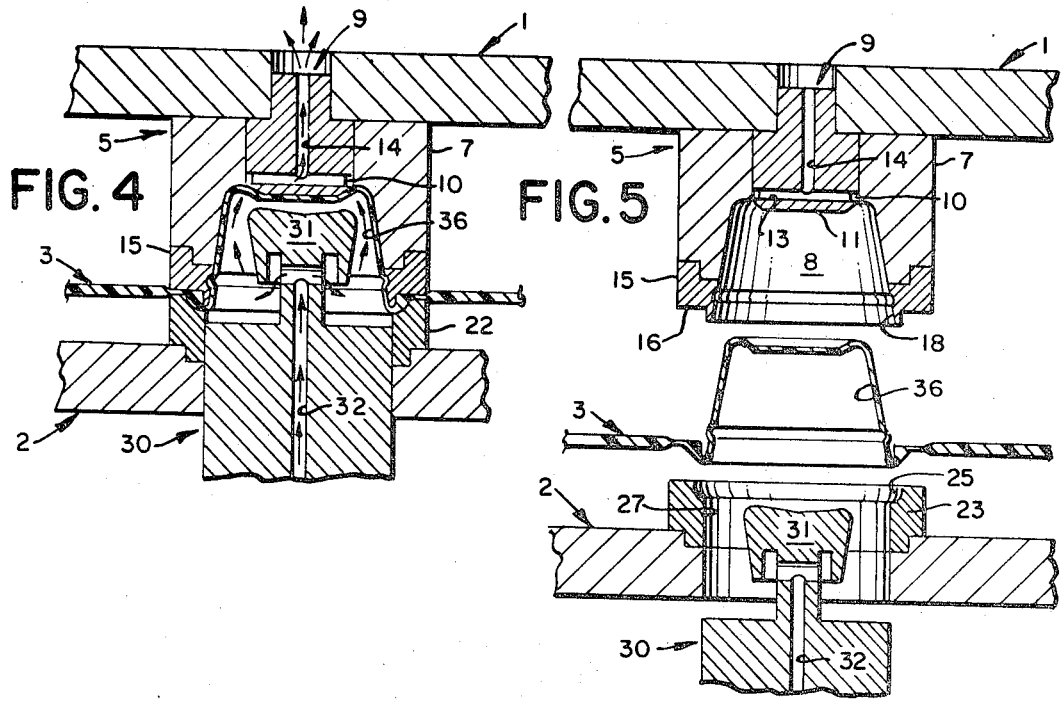
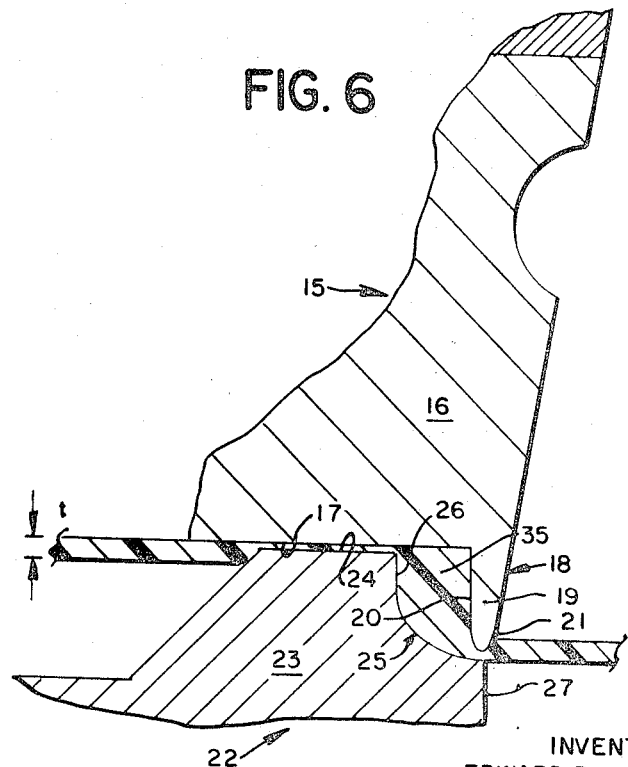
INVENTOR
EDWARD R. KNOWLES
BY
ATTORNEY

Jan. 5, 1971 E. R. KNOWLES 3,551,954
CONTAINER FORMING APPARATUS
Original Filed Sept. 14, 1966 3 Sheets-Sheet 3
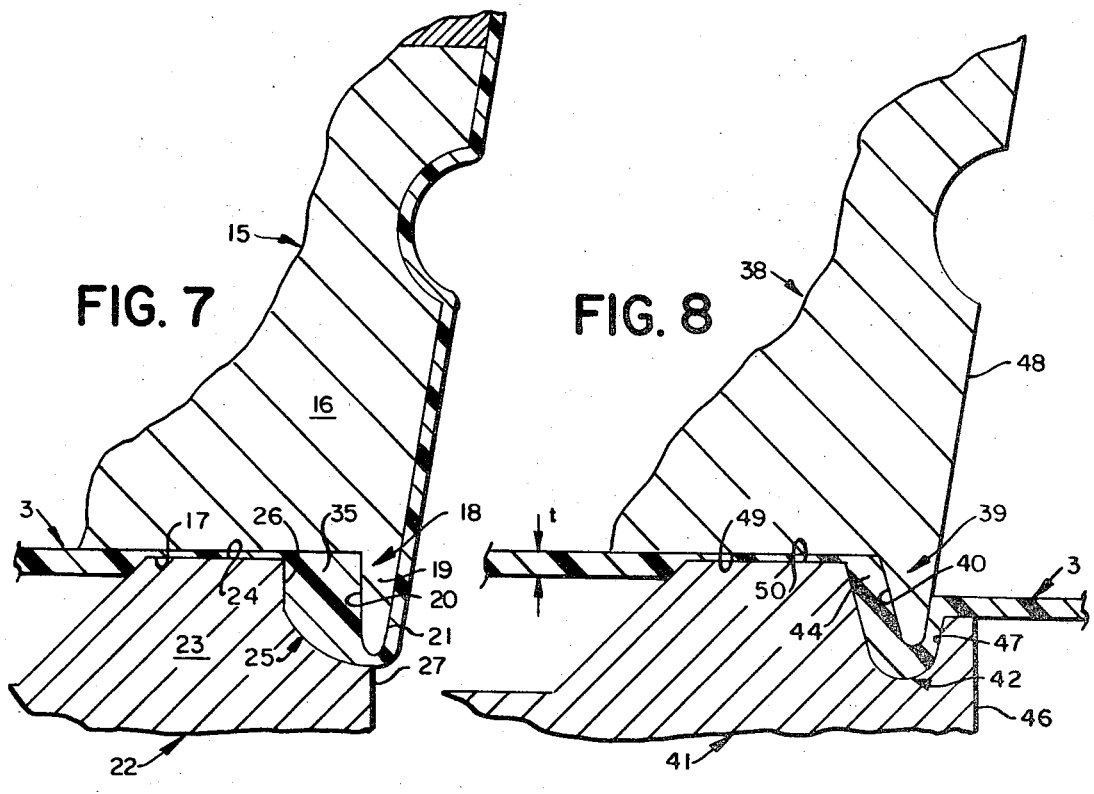
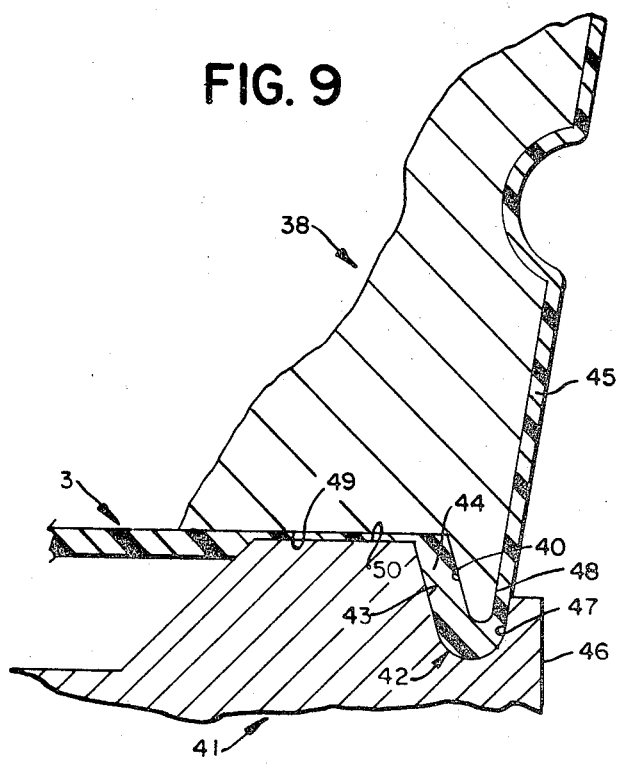
INVENTOR
EDWARD R. KNOWLES
BY
ATTORNEY United States Patent Office 3,551,954
Patented Jan. 5, 1971

3,551,954
CONTAINER FORMING APPARATUS
Edward Rolland Knowles, Cranford, N.J., assignor to Sterling Extruder Corporation, Linden, N.J., a corporation of New Jersey
Original application Sept. 14, 1966, Ser. No. 579,281, now Patent No. 3,470,281, dated Sept. 30, 1969. Divided and this application Apr. 3, 1969, Ser. No. 840,867
Int. Cl. B29c *17/00*
U.S. Cl. 18—19       4 Claims

ABSTRACT OF THE DISCLOSURE

Apparatus for forming a cup-shaped, flange container from moldable material including a die member for forming a thickened flange portion having a thickness greater than the thickness of the moldable material, and forming mechanism for forming the portion of the moldable material disposed inwardly of the flange into a cup-shaped configuration without disturbing the flange.

RELATED APPLICATION

This is a divisional application of copending application, Ser. No. 579,281, filed Sept. 14, 1966, now Pat. No. 3,470,281.

The present invention relates to a mold apparatus for making a flanged article and more particularly to an open ended container having a flange at its open end which is thicker in cross-section than the thickness of the stock material from which the container is made.

Heretofore, flanged articles, such as open ended containers, have been made by forming the container about a mandrel with the open end of the container being provided with a hollow rolled bead. The bead of this type of container gives a certain amount of rigidity to the article. Its formation, however, usually requires separate apparatus and a separate manufacturing step independent of the step in which the cup-shaped portion of the container is formed and thus adds to the overall cost of the container. In addition, containers formed with a rolled bead do not in all instances provide the rigidity necessary to assure a secure attachment of a separate cover.

Flanged containers have also been made by clamping an annular portion of stock material between a pair of dies and thereafter forming the cup-shaped portion of the container over a mandrel disposed inside the clamped portion. This procedure has the disadvantage of weakening the clamped portion of the container since the clamped material tends to stretch, and as a result thin out, as the intermediate portion is stretched into the desired cup-shape. To overcome this, clamping dies may be used which have a shape that will lock the clamped material against lateral movement by forming a depression in the material which is to form the flange of the container. With this construction, however, the flanged portion of the container becomes distorted and its resulting thickness is limited by the thickness of the stock material from which the container is to be made.

In accordance with the teachings of the present invention, there is provided a mold apparatus for making a container with a flange having a thickness greater than that of the stock material from which it is formed. Generally, this result is produced by clamping an annular portion of the stock material which is to form the container flange between a pair of dies which, in addition to clamping this material against lateral movement, operate to force additional stock material from adjacent areas into the clamped portion to thereby increase its thickness and the thickness of the resulting flange. The cup-shaped portion of the container is then formed by stretching the stock material disposed inside the clamped portion into the desired shape without disturbing the previously formed flange; and the formed container is thereafter severed from the surrounding stock material by a suitable severing mechanism.

In accordance with the teachings of the present invention, it is possible to simultaneously form a plurality of containers having reinforced, thickened flanges from a single sheet of stock material with a minimum amount of wasting of material and in a press which is quite compact and simple in construction.

A fuller understanding of the present invention will be obtained from a reading of the following detailed description thereof with reference being made to the accompanying drawings of which:

FIG. 1 is a cross-sectional view showing a portion of the container forming apparatus of the present invention in open position;

FIG. 2 is a cross-sectional view of a portion of the apparatus of FIG. 1 showing one set of forming dies in clamped engagement with a piece of stock material;

FIG. 3 is a cross-sectional view of the structure of FIG. 2 showing the plug assist member in raised position;

FIG. 4 is a view similar to FIG. 3 showing the path of flow of the forming air used for forming the final cup-shaped portion of the container;

FIG. 5 is a cross-sectional view of the structure of FIG. 2 in open position with the formed container positioned for removal therefrom;

FIG. 6 is a cross-sectional view showing a portion of the forming dies of FIG. 2 in enlarged detail;

FIG. 7 is an enlarged cross-sectional view similar to FIG. 6 showing the orientation of the cup-shaped portion of the container with respect to the forming dies;

FIG. 8 is an enlarged cross-sectional view of a modified construction of the forming dies; and FIG. 9 is an enlarged cross-sectional view similar to FIG. 8 showing the orientation of the cup-shaped portion of the container with respect to the forming dies.

As shown in FIG. 1, the container forming apparatus of the present invention generally includes upper frame and lower frame members 1 and 2, respectively. These members are disposed in facing relationship to each other on opposite sides of the path of movement of the stock material 3 from which the containers are to be formed. The stock material is of predetermined thickness *t* and is of the type which is moldable under heat and pressure, as for example, thermoplastic material. As indicated by the arrow in FIG. 1, the stock material is fed by suitable means, not shown, into a position between the frame members 1 and 2. Before being fed to this position, however, the stock material is passed through a suitable oven 4 in which it is heated to the required molding temperature.

The frame members 1 and 2 of the container forming apparatus include a plurality of container forming units 5 and 6, two of which are shown in FIG. 1. Since each of these units are of the same construction, the description of their details which follows will be directed to a single unit. As shown in the drawings, each unit is comprised of two halves, one of which is connected to the frame member 1 and the other to the frame member 2. The part of the unit connected to the upper frame member 1 comprises a cavity block 7 having an open ended cavity 8 therein.

Disposed at the bottom of the cavity 8 is a plug member 9. This plug member is provided with an annular circumferential recess 10 separating a lower portion 11 from the body portion 12 thereof; and as shown in FIG. 1, the lower portion 11 has an outer diameter less than that of the body portion 12 so as to permit communication between the circumferential recess 10 and the interior of the cavity 8. A venting passage 13 is drilled through the plug member 9 to connect the circumferential recess with a vertical venting passage 14 leading to the atmosphere through suitable conduits, not shown.

An annular male forming die 15 is removably attached to the lower face of the cavity block 7 in surrounding relationship with respect to the open end of the cavity 8. In construction, the forming die 15, as shown most clearly in FIGS. 6 and 7, comprises a first annular portion 16 having a generally flat surface 17 facing outwardly of the cavity 8 and a second annular portion 18 disposed radially inwardly of such flat surface 17. This second annular portion includes an annular rib 19 extending outwardly of the cavity beyond the flat surface 17 which has a radially outer annular surface 20 disposed at right angles with respect to the flat surface 17 and an inner annular surface 21 forming a continuation of the wall of the cavity 8.

The part of the forming unit connected to the lower frame 2 comprises an annular female forming die 22 disposed in opposing relationship with respect to the male forming die 15. This forming die includes a first annular portion 23 having a generally flat surface 24 facing the flat surface 17 of the male forming die 15 for cooperation therewith as more fully described below. In addition, the female forming die includes a second annular recess portion 25 disposed in opposing relationship with respect to the annular rib 19 of the male forming die.

As more clearly shown in FIGS. 6 and 7, the annular wall surface 26 of the recess 25 is spaced from the outer annular surface 20 of the male rib member 19 by a distance which is greater than the thickness $t$ of the stock material 3 from which the container is to be formed. Also, the female recess 25 in this embodiment of the invention extends to the inner wall surface 27 of the female forming die. The female forming die has a central opening, defined by the inner wall surface 27, extending therethrough and is removably attached to the frame member 2 about an opening 28.

Disposed below the frame 2 is a plug assist support frame 29 and fixed to this frame are a plurality of plug assist members 30 each of which is aligned with one of the openings 28 in the frame member 2. Each plug assist member terminates in a forming head 31 and is provided with a passage 32 extending to a point below the head. The lower end of the passage 32 communicates with a suitable inlet passage 33 leading to a source of forming air, not shown. Also mounted on the frame 29 are a plurality of positioning members 34 which face upwardly toward the bottom of the frame member 2.

In operation, the frame members 1 and 2 are moved relatively by a suitable mechanism, not shown, toward each other to clamp the stock material 3 between the forming units. This initial clamped position is shown in FIGS. 2 and 6. As the flat surfaces 17 and 24 of the forming dies approach each other, they compress the stock material disposed therebetween and force it laterally into the area between the outer annular surface 20 and the annular wall surface 26 of the forming dies. As the stock material is directed into this area, it forms what will be the flange portion 35 of the container; and it will be noted from FIG. 6 that this flange portion is produced with a thickness greater than the thickness $t$ of the stock material.

Once the dies are in the position shown in FIGS. 2 and 6, the frame 29 is moved upwardly by a suitable mechanism, not shown, to move the plug assist member through the openings 28 of the frame 2 and through the female forming die. As the plug assist member is moved in this direction, it comes into engagement with the lower surface of the stock material which is disposed inwardly of the forming dies and stretches this material into the cavity 8. The movement of the plug assist member upwardly is stopped by the positioning members 34 upon the latter's engagement with the lower surface of the frame 2. FIG. 3 shows the plug assist member in its upper extreme position.

Once this position of the plug assist member is attained, forming air under a suitable pressure such as 50 p.s.i. is fed through the passages 33 and 32 and into the cavity 8 so as to force the stock material disposed therein against the cavity wall surface and thus form the cup-shaped portion 36 of the container. The venting passages 13 and 14 in the plug member 9 permit a venting of air entrapped between the cavity wall and the stock material. The forming air is supplied until the stock material takes on the shape dictated by the contour of the wall surface of the cavity 8.

During the movement of the stock material into the cavity as caused by both the plug assist member and the forming air, the flange portion 35 of the container is prevented from moving laterally inwardly of the forming dies since the annular rib 19 forms a barrier preventing such movement. Accordingly, as the cup-shaped portion 36 of the container is formed by stretching and molding the stock material disposed inwardly of the rib 19, the shape and thickness of the flange is uneffected.

After the container has been formed, the frame members 1 and 2 are moved relatively away from each other and the plug assist member is retracted into the opening 28 of the frame 2. During this movement of the members 1 and 2 away from each other, the stock material is held by the feeding means so that it will separate from the forming dies. The formed container is then moved to the right, as viewed in FIG. 1 away from the forming dies and to a suitable trimming press. This movement of the stock material and the formed container simultaneously effects a feeding of a new section of stock material from the oven to a position between the forming dies. It will be understood that at the same time the forming dies are forming the containers, the trimming press can be operated to sever the previously formed container from the stock material.

FIGS. 8 and 9 show a modified embodiment of the male and female forming dies of the present invention. As there shown, the male forming die 38 has an annular rib 39 which has an outer annular surface 40 which is tapered radially inwardly. In addition, the female forming die 41 is provided with an annular recess 42 which has an outer annular wall surface 43 tapered to complement the tapered surface 40. With this construction, the container will be formed, as shown in FIG. 9, with a flange portion 44 which is bent downwardly and outwardly of the container's cup-shaped portion 45.

The annular recess 42 of this embodiment of the female forming die further differs from the construction shown in FIGS. 6 and 7 in that it is disposed at a position spaced from the inner wall 46 of the forming die and has an inner annular wall surface 47 which is tapered to complement the inner surface 48 of the annular rib 39. As shown in FIGS. 8 and 9, the spacing of the surfaces 47 and 48 is such that when the dies are in clamp position, the distance between these surfaces will be less than the thickness $t$ of the stock material. With this construction, movement of the dies 38 and 41 toward each other will direct stock material from the area between the surfaces 47 and 48 into the area between the surfaces 40 and 43. This movement of stock material into the area between the surfaces 40 and 43 is in addition to the movement of stock material effected by the movement of the annular surfaces 49 and 50 toward each other.

After the stock material is clamped as shown in FIG. 8, the cup-shaped portion 45 of the container is formed as described above with reference to FIGS. 1–7 by stretching and molding the stock material disposed inwardly of the annular rib 39. As shown in FIG. 9, the resulting thickness of the cup-shaped portion will be substantially equal to the reduced thickness of the material between the die surfaces 47 and 48, thus giving the container wall a uniform thickness throughout.

Although the description given above has been primarily directed to the formation of a single container, it is to be understood that the apparatus of the present invention will advantageously include a plurality of forming units constructed as shown in the drawings. The spacing of the units from each other may be at a minimum since the individual halves of the units require no moving parts; and accordingly, wastage of material is kept at a minimum and maintenance of the apparatus is greatly simplified.

The above description of the present invention has been made with respect to the presently preferred construction and method of operation. However, it is understood that varoius changes may be made, as for example, changing the shape of the die members to produce containers having different flange shapes, without departing from the scope of the invention as set forth in the following claims.

I claim:

1. Apparatus for forming a cup-shaped, flanged article from a sheet of thermoplastic material having a predetermined thickness comprising:
   (a) a first member having a cup-shaped cavity therein;
   (b) an annular male forming die positioned in surrounding relationship with respect to the open end of said cavity, said male forming die having:
      (1) a first annular portion having a generally flat surface facing outwardly of said cavity, and
      (2) a second annular portion disposed radially inwardly of said first annular portion and including an annular rib extending outwardly of said cavity beyond said flat surface;
   (c) a second member disposed in opposed relationship with respect to said first member; and
   (d) an annular female forming die positioned on said second member in opposing relationship with respect to said male forming die, said female forming die having:
      (1) a first annular portion having a generally flat surface facing the flat surface of said male forming die, and
      (2) a second annular portion disposed radially inwardly of said first annular portion of said female forming die and including an annular recess opposing the annular rib of said male forming die and having an outer annular wall surface adjacent the flat surface of said female forming die which is spaced from the outer annular surface of the rib of said male forming die by a distance greater than the predetermined thickness of said sheet material;
   (e) means for moving said first and second members and dies relative to each other and toward opposite sides of said sheet of material disposed therebetween to a position where said first annular portions are spaced from each other by a distance less than the predetermined thickness of said sheet of material and said rib is disposed in spaced relationship within said recess whereby material produced by said decrease in thickness is directed into the space between said rib and the outer annular wall surface of said recess; and
   (f) means for molding the portion of said sheet disposed inwardly of the second annular portion of said male forming die into the cavity of said first member to form the cup-shaped portion of the flanged article.

2. Apparatus for forming a cup-shaped, flanged article according to claim 1 wherein:
   (a) the outer surface of said rib is tapered radially inwardly.

3. Apparatus for forming a cup-shaped, flanged article according to claim 1 wherein:
   (a) the annular recess of said female forming die extends to the inner wall surface thereof.

4. Apparatus for forming a cup-shaped, flanged article according to claim 3 wherein:
   (a) the inner surface of said rib forms a continuation of the cup-shaped cavity of said first member.

References Cited

UNITED STATES PATENTS

| | | | |
|---|---|---|---|
| 3,235,639 | 2/1966 | Knowles | 18—19X |
| 3,260,781 | 7/1966 | Lux et al. | 18—19X |
| 3,336,424 | 8/1967 | Cheney | 18—19X |
| 3,338,997 | 8/1967 | Tigner | 18—19X |
| 3,342,918 | 9/1967 | Edwards | 18—19X |

J. HOWARD FLINT, JR., Primary Examiner